US012199329B2

(12) United States Patent
McNichols et al.

(10) Patent No.: US 12,199,329 B2
(45) Date of Patent: Jan. 14, 2025

(54) REMOVEABLE SATELLITE ANTENNA POINTING TOOL

(71) Applicant: Viasat, Inc., Carlsbad, CA (US)

(72) Inventors: James M. McNichols, Carlsbad, CA (US); Andrew Galaud, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 261 days.

(21) Appl. No.: 17/774,820

(22) PCT Filed: Nov. 15, 2019

(86) PCT No.: PCT/US2019/061598
§ 371 (c)(1),
(2) Date: May 5, 2022

(87) PCT Pub. No.: WO2021/096523
PCT Pub. Date: May 20, 2021

(65) Prior Publication Data
US 2022/0393334 A1 Dec. 8, 2022

(51) Int. Cl.
*H01Q 1/12* (2006.01)
*H01Q 1/28* (2006.01)

(52) U.S. Cl.
CPC ........... *H01Q 1/1228* (2013.01); *H01Q 1/125* (2013.01); *H01Q 1/288* (2013.01)

(58) Field of Classification Search
CPC ...... H01Q 1/1228; H01Q 1/125; H01Q 1/288; H01Q 3/04; H01Q 3/08; H01Q 19/13
See application file for complete search history.

(56) References Cited

U.S. PATENT DOCUMENTS

| | | | | |
|---|---|---|---|---|
| 4,726,259 A * | 2/1988 | Idler | H02K 7/116 | 343/882 |
| 9,966,650 B2 * | 5/2018 | Burdick | H04B 7/18513 | |
| 2003/0071762 A1 * | 4/2003 | Tulloch | H01Q 19/132 | 343/882 |
| 2003/0112194 A1 * | 6/2003 | Watson | H01Q 3/02 | 343/757 |

(Continued)

FOREIGN PATENT DOCUMENTS

JP H06224616 8/1994

OTHER PUBLICATIONS

International Search Report and Written Opinion dated Sep. 10, 2020 in Application No. PCT/US2019/061598.

*Primary Examiner* — Seokjin Kim
(74) *Attorney, Agent, or Firm* — Snell & Wilmer L.L.P.

(57) ABSTRACT

A removeable satellite antenna pointing tool can include a mounting gear releasably engageable with a pole that supports a satellite antenna. The removeable satellite antenna pointing tool can also include an azimuth gear subsystem housed in a frame and engaged with the mounting gear and a motor that drives the azimuth gear subsystem, wherein actuation of the motor causes the frame to rotate about the pole. The removeable satellite antenna pointing tool can further include a linear drive that controls an elevation of a control shaft engageable with a fixture attached to the satellite antenna. Actuation of the motor can change an azimuth of the satellite antenna and actuation of the linear drive can change an elevation of the satellite antenna.

17 Claims, 13 Drawing Sheets

(56) References Cited

U.S. PATENT DOCUMENTS

| | | | | |
|---|---|---|---|---|
| 2003/0214449 | A1* | 11/2003 | King | H01Q 3/08 343/765 |
| 2011/0298672 | A1* | 12/2011 | Otto | H01Q 3/08 343/894 |
| 2014/0166843 | A1* | 6/2014 | Bertocchi | H01Q 3/08 248/550 |
| 2015/0097743 | A1* | 4/2015 | Evans | H01Q 1/427 343/754 |
| 2016/0336651 | A1* | 11/2016 | Anderson | H01Q 3/08 |
| 2017/0047653 | A1* | 2/2017 | Runyon | H01Q 3/06 |
| 2017/0317414 | A1* | 11/2017 | Anderson | H01Q 1/125 |
| 2018/0301784 | A1* | 10/2018 | Venghaus | H01Q 1/42 |
| 2019/0348752 | A1 | 11/2019 | Kim et al. | |
| 2021/0218138 | A1* | 7/2021 | Runyon | H01Q 3/08 |

* cited by examiner

REMOVEABLE SATELLITE ANTENNA POINTING TOOL

CROSS-REFERENCE TO RELATED APPLICATIONS

This application is a U.S. national stage entry under 35 U.S.C. § 371 of International Application No. PCT/US2019/061598 filed Nov. 15, 2019, entitled “REMOVEABLE SATELLITE ANTENNA POINTING TOOL”. The foregoing application is hereby incorporated by reference in its entirety (except for any subject matter disclaimers or disavowals, and except to the extent of any conflict with the disclosure of the present application, in which case the disclosure of the present application shall control).

TECHNICAL FIELD

This disclosure relates generally to satellite communications. More particularly, this disclosure describes a removeable satellite antenna pointing tool.

BACKGROUND

A satellite antenna (e.g., a directional antenna) can be aligned upon deployment to the location the satellite antenna is to be used. An installer can attach a support structure of the satellite antenna to an object (e.g., ground, a building or other structure, etc.) and carry out an alignment process to point the beam of the satellite antenna towards a target antenna (e.g., on a geostationary satellite). The alignment process may include loosening bolts on a mounting bracket on the back of the antenna support structure and physically moving the satellite antenna until the satellite antenna sufficiently pointed at the target using a signal metric (e.g., signal strength) of a signal communicated between the satellite antenna and the target. Once sufficiently pointed, the installer can tighten the bolts to immobilize the mounting bracket.

The satellite antenna can be implemented as a satellite dish of a satellite ground station. In such a situation, the satellite antenna includes a parabolic reflector and a feed antenna. Moreover, the support structure for the satellite antenna can include a pole on which the satellite antenna is mounted. Further, the support structure can include a moveable joint or multiple pivot points to allow the satellite antenna to change an azimuth and elevation to adjust the pointing of the satellite antenna.

SUMMARY

One example relates to a removeable satellite antenna pointing tool that can include a mounting gear releasably engageable with a pole that supports a satellite antenna. The removeable satellite antenna pointing tool can also include an azimuth gear subsystem housed in a frame and engaged with the mounting gear and a motor that drives the azimuth gear subsystem, wherein actuation of the motor causes the frame to rotate about the pole. The removeable satellite antenna pointing tool can further include a linear drive that controls an elevation of a control shaft engageable with a fixture attached to the satellite antenna. Actuation of the motor can change an azimuth of the satellite antenna and actuation of the linear drive can change an elevation of the satellite antenna.

Another example relates to a removeable satellite antenna pointing tool that includes a mounting gear releasably engageable with a pole that supports a satellite antenna. The mounting gear can include a friction region having a first radius of curvature, the friction region being shaped to partially circumscribe the pole and a toothed region having a second radius of curvature, the second radius of curvature being greater than the first radius of curvature. The removeable satellite antenna pointing tool can also include an azimuth gear subsystem comprising a gear interlocked with the toothed region of the mounting gear and a motor rigidly attached to a frame of the removeable satellite antenna pointing tool, the motor driving the azimuth gear subsystem to rotate the frame about the pole with one degree of freedom. The removeable satellite antenna pointing tool can further include a linear drive that controls an elevation of a control shaft that is attachable to a fixture of the satellite antenna. The linear drive can be affixed to the frame of the removeable satellite antenna pointing tool. Actuation of the linear drive can change an elevation of the satellite antenna and the actuation of the first motor can control rotation of the control shaft to adjust an azimuth of the satellite antenna.

DETAILED DESCRIPTION

This disclosure describes a removeable satellite antenna pointing tool that is employable to align a pointing direction on a satellite antenna (e.g., a satellite dish) such that the satellite antenna points toward a target satellite. The removeable satellite antenna pointing tool can be temporarily installed to align the satellite antenna, removed, and reused to align another satellite antenna.

The removeable satellite antenna pointing tool can include a frame for housing components. The removeable satellite antenna pointing tool can include a mounting gear with a friction region shaped to receive a portion of a support structure (e.g., a pole) of the satellite antenna. The mounting gear also includes a toothed region interlocked with a first spur gear. The first spur gear can be mechanically coupled to a second spur gear with a shaft. A worm gear can be interlocked with the first spur gear. The removeable satellite antenna pointing tool can include an azimuth control motor attached to the frame that drives the worm gear. A linear drive attached to the frame can control a vertical position of a control shaft that is attached to the frame of the satellite antenna. More particularly, actuation of the linear drive can change a vertical position of the control shaft to control an elevation of the satellite antenna. Similarly, actuation of the azimuth control motor controls rotation of the control shaft to adjust an azimuth angle of the satellite antenna. Accordingly, the azimuth and elevation of the satellite antenna can be adjusted.

In some examples, the linear drive and the azimuth control motor can be controlled by a controller that communicates with a mobile device (e.g., a smart phone). In such a situation, the mobile device is employable to calculate a pointing direction for the satellite antenna based on a geographic location of the mobile device relative to the target satellite. The mobile device can employ the calculated pointing direction to command the controller to set the azimuth and elevation of the satellite antenna. In response, the controller can control the azimuth control motor and the linear drive to align the satellite antenna.

Figure 1:
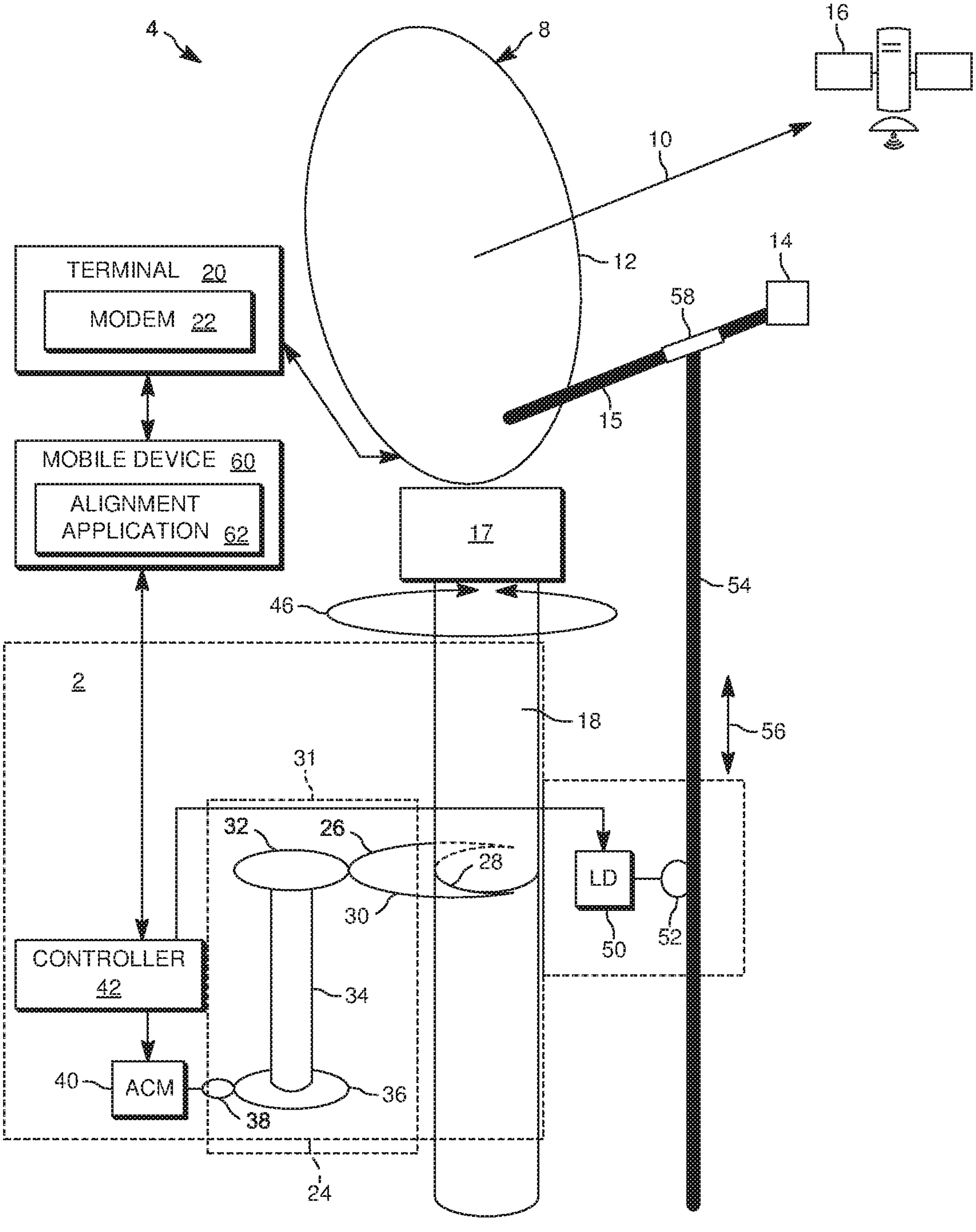
FIG. 1 illustrates a block diagram of a removeable satellite antenna pointing tool that is mounted on a satellite ground station to adjust a pointing direction of a satellite antenna.

FIG. 1 illustrates an example of a removeable satellite antenna pointing tool 2 that can be temporarily mounted on a satellite ground station 4 to adjust a pointing direction of a satellite antenna 8, wherein the pointing direction is represented by an arrow 10. The satellite antenna 8 can be implemented as a satellite dish that includes a reflector 12 and antenna feed 14. The antenna feed 14 can be held in a specific position relative to the reflector 12 by a boom 15. The boom 15 can be a rigid member (e.g., a rod). As an example, the satellite ground station can be implemented as a very small aperture terminal (VSAT) satellite.

The satellite antenna 8 can be designed to communicate with a target satellite 16 when the satellite antenna 8 is pointed toward the target satellite 16. In some examples, the communication between the target satellite 16 and the satellite antenna 8 can be bi-directional, such as network communication (e.g., Internet access). In other examples, the communication can be one-way communication from the target satellite 16 to the satellite antenna 8, such as in situations where the satellite antenna receives a broadcast signal.

The satellite antenna 8 can be affixed to a lockable joint 17 of the satellite antenna support structure. In an unlocked condition, the lockable joint 17 can provide two axes of rotation to change the pointing direction 10 of the satellite antenna 8 such that the azimuth and elevation of the satellite antenna 8 can be adjusted. In some examples, the lockable joint 17 can be representative of a hinge and a sleeve affixed to a pole 18 of the satellite antenna support structure. The lockable joint 17 and the pole 18 can be components of a satellite antenna support structure for the satellite antenna 8. In other examples, the lockable joint 17 can be a ball lockable joint that allows movement in multiple directions. In a locked condition, the lockable joint 17 can hold the satellite antenna 8 in a static position. The lockable joint 17 can be unlocked, for example, by loosening fasteners (e.g., bolts), and the lockable joint 17 can be locked tightening of such fasteners. In some examples, the pole 18 can be affixed to a building. In other examples, the pole 18 can be planted in the ground.

In situations where the satellite antenna 8 is aligned such that the satellite antenna 8 points towards the target satellite 16, a communication signal (e.g., bidirectional communication signal or one-way downlink signal) can be provided to a terminal 20. The terminal 20 can be implemented as a computing platform. In some examples, the terminal 20 can be implemented as a desktop computer, a laptop computer a tablet computer, etc. In other examples, the terminal 20 can be implemented as a set-top box for processing and outputting broadcast signals. The terminal 20 can include a modem 22 that is logically positioned between the satellite antenna 8 and other components of the terminal 20. The modem 22 can decode data transmitted from the target satellite 16 and provide such data to the terminal 20 or another system. Additionally, in examples where the satellite antenna 8 allows bidirectional communication with the target satellite 16, the modem 22 can encode data transmitted from the terminal 20 onto a carrier signal that can be transmitted to the target satellite 16. Further, in some examples, the modem 22 can include a WiFi transceiver that allows communication with an external system, as discussed herein.

Precise alignment of the satellite antenna 8 is needed to elevate a signal-to-noise ratio (SNR) of signals transmitted between the target satellite and the satellite antenna 8. Stated differently, the precision of the pointing direction 10 towards the target satellite 16 impacts the signal strength of the signal to the modem 22. Increase in the signal strength elevates bandwidth during periods of high signal strength and reduces downtime during periods of high interference (and a relatively low signal strength). However, during installation of the satellite antenna 8, manual alignment of the satellite antenna 8 can be relatively imprecise, such that the SNR of signals transmitted between the target satellite 16 and the satellite antenna 8 may be unacceptably low, particularly during time periods with levels of relatively high interference (e.g., during a thunderstorm).

Accordingly, to improve the precision of the pointing direction 10 of the satellite antenna 8, an installer can temporarily affix the removeable satellite antenna pointing tool 2 the pole 18 of the antenna support structure. Additionally, the installer can unlock the lockable joint 17 (e.g., loosen the fasteners) to allow the satellite antenna 8 to change directions. The removeable satellite antenna pointing tool 2 can be employed to align the pointing direction 10 of the satellite antenna 8 toward the target satellite 16. More particularly, the removeable satellite antenna pointing tool 2 can cause the satellite antenna 8 to pivot about the two axes allowed by the lockable joint 17 to adjust the pointing direction 10 of the satellite antenna 8.

The removeable satellite antenna pointing tool 2 can include frame 24 that houses components. The removeable satellite antenna pointing tool 2 can include a mounting gear 26 that is partially enclosed by the frame 24. The mounting gear 26 can include a friction region 28 with a first radius of curvature that is shaped to partially circumscribe the pole 18. An attachment mechanism (not shown) can hold the mounting gear tightly against the pole 18. In some examples, the attachment mechanism can be implemented as a mounting bracket that can be affixed to the mounting gear 26 to fully circumscribe the pole 18 and to provide a compressive force (e.g., a press-fit) on the pole 18 of the satellite antenna support structure. In other examples, the attachment mechanism can be implemented as a strap (e.g., a fabric strap or a metallic strap) to apply compressive force to affix the mounting gear 26 to the pole 18. In either situation, a force of friction between the pole 18 and the friction region 28 of the mounting gear 26 hold the mounting gear 26 in a static position. The mounting gear 26 can also include a toothed region 30 with gear teeth. The toothed region 30 can have a second radius of curvature that is greater than the first radius of curvature. An azimuth gear subsystem 31 that engages with the mounting gear 26 can allow adjustment of the azimuth of the satellite antenna 8. Specifically, the toothed region 30 of the mounting gear 26 can be interlocked with teeth of a first spur gear 32 of the azimuth gear subsystem 31.

The first spur gear 32 can be affixed to a shaft 34 of the azimuth gear subsystem 31 that extends through a center hole of the first spur gear 32. The shaft 34 can also extend through a center hole of a second spur gear 36 of the azimuth gear subsystem 31. The second spur gear 36 can include gear teeth interlocked with a worm gear 38 of the azimuth gear subsystem 31. The worm gear 38 can be driven by an azimuth control motor 40 (labeled "ACM"). The azimuth control motor 40 can be controlled by a controller 42. The controller 42 can be implemented as a microcontroller or a single-board computer. Moreover, the controller 42 can command the azimuth control motor 40 to actuate or deactivate. Actuation of the azimuth control motor 40 causes the worm gear 38 to spin, which in turn causes the second spur gear 36 and the first spur gear 32 (coupled by the shaft 34) to spin. The first spur gear 32 and the mounting gear 26 can operate as a curved rack (e.g., a curved rack with an angular distance of about 180 degrees or less) and pinion gear set. Additionally, the mounting gear 26 is held in a stationary position because the mounting gear 26 is affixed to the pole 18. Thus, spinning of the first spur gear 32 causes the remaining components of the removeable satellite antenna pointing tool 2 that are housed in in the frame 24 to rotate about the pole 18 in a direction indicated by an arrow 46.

In other examples, there could be more or less gears in the azimuth gear subsystem 31. For instance, in some examples, the azimuth control motor 40 can be coupled directly to a gear that is interlocked with the toothed region of the mounting gear. Additionally, in examples where there is more than one mounting gear, there could be more spur gears.

Additionally, the controller 42 can control a linear drive 50 (labeled "LD") of the removeable satellite antenna pointing tool 2 that is affixed to the frame 24. In some examples, the linear drive 50 can be implemented as a stepper motor to drive a screw gear 52 or other mechanism attached to a control shaft 54. Actuation of the linear drive 50 changes an elevation of the control shaft 54 in a direction indicated by an arrow 56. In other examples, the linear drive 50 can be implemented as a linear actuator. In yet other examples, the linear drive 50 can be implemented as a hydraulic actuator. The control shaft 54 can be temporarily affixed to the boom 15 with a bracket 58. Thus, movement of the control shaft 54 causes corresponding movement to the satellite antenna 8, thereby changing the pointing direction 10 of the satellite antenna 8.

As noted, actuation of the azimuth control motor 40 causes the frame 24 of the removeable satellite antenna pointing tool 2 to rotate about the pole 18 in the direction indicated by the arrow 46. Because the control shaft 54 is coupled to the boom 15, rotation of the frame 24 of the removeable satellite antenna pointing tool 2 causes the azimuth of the satellite antenna 8 to change. Additionally, as noted, actuation of the linear drive 50 can cause the control shaft 54 to change elevation in the direction indicated by the arrow 56. Changing the elevation of the control shaft 54 changes the direction of the satellite antenna 8. Thus, actuation of the azimuth control motor 40 by the controller 42 changes an azimuth of the satellite antenna 8, and actuation of the linear drive 50 by the controller 42 changes an elevation of the satellite antenna 8. In this manner, the pointing direction 10 of the satellite antenna 8 can be adjusted in response to commands from the controller 42.

During an installation procedure, the installer can employ a mobile device 60. The mobile device 60 can be implemented as a computing platform, such as a smart phone, a tablet computer, a laptop computer, etc. The mobile device 60 can include a global navigation satellite system (GNSS) device, such as a global positioning system (GPS) or GLONASS device that can employ location satellite signals to determine a location and orientation of the mobile device 60. Additionally, the mobile device 60 can include a magnetometer and a gyroscope. The mobile device 60 can communicate with the controller 42 via a wireless personal area network connection, such as a Bluetooth connection. Similarly, the mobile device 60 can communicate with the modem 22 via the WiFi connection. The mobile device 60 can include a nontransitory memory (e.g., random access memory) for storing data and machine executable instructions. The mobile device 60 can also include a processing unit (e.g., one or more processor cores) for accessing the non-transitory memory and executing the machine executable instructions. The machine executable instructions can include an alignment application 62.

The alignment application 62 and the removeable satellite antenna pointing tool 2 can be employed by the installer to guide the alignment of the satellite antenna 8 in an alignment process. More specifically, the alignment application 62 can query the GNSS device, the magnetometer and the gyroscope for a current location and orientation of the mobile device 60. Based on the current location and orientation, the alignment application 62 can determine and output an initial azimuth direction for the satellite antenna 8. The installer can manually set the initial azimuth direction for the satellite antenna 8 by rotating the satellite antenna 8 to a position that is within 90 degrees of a proper azimuth for the satellite antenna 8.

Additionally, continuing with the alignment process upon confirming that the initial azimuth for the satellite antenna 8 is set, the alignment application 62 can determine an azimuth and elevation for the satellite antenna 8 based on the determined location of the mobile device 60 and a known relative position of the target satellite 16. The alignment application 62 can command the controller 42 to make coarse adjustments to the azimuth and elevation to the pointing direction 10 of the satellite antenna 8 based on the determined azimuth and elevation for the satellite antenna 8. In some examples, the alignment application 62 can communicate with the controller 42 via the wireless network connection.

More specifically, the alignment application 62 can command the controller 42 to determine a current pointing direction 10 of the satellite antenna 8 and to change the pointing direction 10. As an example, the alignment application 62 can command the controller 42 to determine a current position of the frame 24 and the control shaft 54 relative to the position of the satellite antenna 8. More particularly, the controller 42 can actuate the azimuth control motor 40 and the linear drive 50 until extreme positions for the frame 24 and the control shaft 54 are reached. Additionally, the alignment application 62 can command the controller 42 to actuate the azimuth control motor 40 to set the azimuth to the determined azimuth for the satellite antenna 8 and to actuate the linear drive 50 to set the elevation for the satellite antenna 8 in a coarse direction setting operation thereby setting the pointing direction 10 for the satellite antenna 8. In response, the controller 42 can employ an internal magnetometer to determine a present orientation of the satellite antenna 8 and send command signals to the azimuth control motor 40 and the linear drive 50 to set the elevation for the satellite antenna 8 in a coarse direction setting operation thereby setting the pointing direction 10 for the satellite antenna 8 within 3 degrees (in both azimuth and elevation) of a peak signal direction (e.g., a direction with a greatest SNR).

Upon completing the coarse direction setting operation, the satellite antenna 8 can detect a signal from the target satellite 16. The alignment application 62 can communicate with the modem 22 via the Wi-Fi connection between the mobile device 60 and the modem 22. In response to completing the coarse direction setting operation, the alignment application 62 can execute a fine direction setting operation of the alignment process.

To execute the fine direction setting operation, the alignment application 62 queries the modem 22 for data indicating a strength of the signal from the target satellite 16. The alignment application 62 monitors the signal strength and commands the controller 42 to make incremental changes to the pointing direction 10 of the satellite antenna 8 through execution of a scanning algorithm (e.g., a spiral drive or step track) to find a pointing direction 10 with a peak (or near peak) SNR. After setting the pointing direction 10 for the satellite antenna 8 to the peak (or near peak) SNR, the alignment application 62 commands the controller 42 to deactivate the azimuth control motor 40 and the linear drive 50 to hold the current pointing direction 10 for the satellite antenna 8. Moreover, the installer can lock the lockable joint 17 by tightening the fasteners of the lockable joint 17 to hold the satellite antenna 8 in a static position. After locking the lockable joint 17, the removeable satellite antenna pointing tool 2 can be removed from the pole 18 so that the removeable satellite antenna pointing tool 2 can be employed again on a different satellite ground station.

Further, in some examples, during the alignment process, the controller 42 can include an internal accelerometer that can detect an unstable satellite antenna 8 such as due to improper locking of the lockable joint 17 (e.g. not tightening of the fasteners) or an improper mounting of the satellite antenna 8. More particularly, the accelerometer can be oriented to measure vertical acceleration of the satellite antenna, and the controller 42 can be configured to provide a notification to the mobile device 60 that the vertical acceleration of the satellite antenna exceeds a threshold. In such a situation, the controller 42 can provide a warning (or other notification) to the alignment application 62 notifying the installer that the support structure and/or the satellite antenna 8 needs to be inspected and/or that the alignment procedure needs to be reexecuted.

By employing the removeable satellite antenna pointing tool 2, alignment of the satellite antenna 8 is simplified. Additionally, as indicated, the removeable satellite antenna pointing tool 2 is portable and reusable. Therefore, the overall costs for precise alignment of a plurality of ground stations is curtailed.

Figure 2:
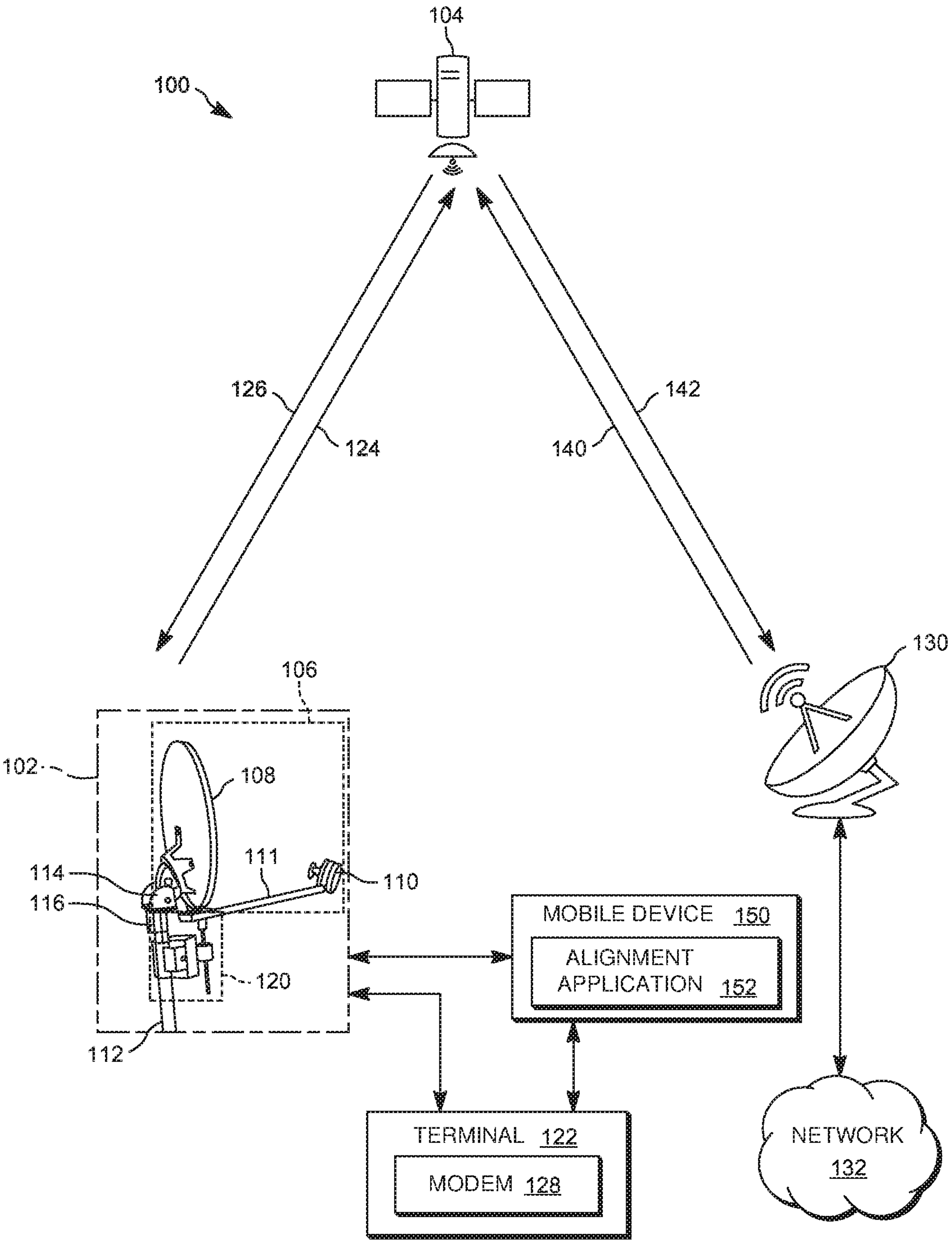
FIG. 2 illustrates an example of a two-way satellite communications system in which an satellite ground station can be employed to communicate with a satellite.

FIG. 2 illustrates an example two-way satellite communication system 100 in which an satellite ground station 102 (not to scale) can be employed to communicate with a target satellite 104 (e.g., a geostationary satellite). The satellite ground station 102 could be implemented with the satellite ground station 4 of FIG. 1 (e.g., as a VSAT ground station). Further, many other configurations are possible having more or fewer components than the two-way satellite communication system 100. Although examples described herein use a satellite communications system for illustrative purposes, the satellite ground station 102 and techniques described herein are not limited to such satellite communication embodiments. For example, the satellite ground station 102 and techniques described herein can instead be employed or point-to-point terrestrial links and also are not limited to two-way communication. In some examples, the satellite ground station 102 can be employed for a receive-only implementation, such as for receiving satellite broadcast television.

The satellite ground station 102 can include a satellite antenna 106 formed of a parabolic reflector 108 and an antenna feed 110. A boom 111 aligns the antenna feed 110 at or near a focal point of the parabolic reflector 108. The satellite antenna 106 can be referred to as a satellite dish. Moreover, the satellite ground station 102 can include a support structure for the satellite antenna. The support structure can include a pole 112, a hinge 114 and a sleeve 116 to facilitate pointing of the satellite antenna 106. The hinge 114 and the sleeve 116 are each instances of a lockable joint (e.g., the lockable joint 17 of FIG. 1). More particularly, to unlock the sleeve 116 fasteners (e.g., bolts) on the sleeve 116 can be loosened to allow the satellite antenna 106 to rotate about the pole 112 to change the azimuth of the satellite antenna. Similarly, a bolt (or other mechanical fastener) can be loosened on the hinge 114 to unlock the hinge allow the satellite antenna to pivot about a vertical axis, thereby allowing the satellite antenna 106 to change elevation. Thus, the hinge 114 and the sleeve 116 can be unlocked to allow pointing of the satellite antenna 106. Upon the satellite antenna pointing toward the target satellite 104, bolts on the sleeve 116 and the hinge 114 can be tightened to lock the respective sleeve 116 and hinge 114 to prevent further movement of the satellite antenna 106. Further, in some examples, there can be more or less components to enable the change pointing of the satellite antenna 106. For example, in some examples, there may be a single lockable ball joint that, in the unlocked condition, can pivot in at least two axes to allow change of the azimuth and elevation of the satellite antenna 106.

The satellite ground station 102 can, for example, be attached to a structure such as the roof or side wall of a building. A removeable satellite antenna pointing tool 120 can be temporarily affixed to the satellite ground station 102 to accurately align an antenna of the satellite ground station 102 with the target satellite 104 at a time of installation of the satellite ground station 102 and/or to correct misalignment caused from improper installation/alignment, weather (e.g., wind gusts) or other external stimuli.

The satellite ground station 102 can communicate with a terminal 122, such as a computing platform. The terminal 122 can include a non-transitory memory for storage of data and machine readable instructions, a processing unit (e.g., one or more processor cores) for accessing the non-transitory memory and executing the machine executable instructions, and components that facilitate communication over the two-way satellite communication system 100. For purposes of simplification of explanation, only one terminal 122 is illustrated in FIG. 2. However, there could be multiple instances of the terminal 122 that can be employed for similar or different reasons.

Once aligned, the satellite antenna 106 can be employed by the terminal 122 to establish an uplink signal 124 to the target satellite 104 and a downlink signal 126 from the target satellite 104. Stated differently, the terminal 122 can be employed as an endpoint of communications that pass through the satellite antenna 106. As one example, the terminal 122 can include a modem 128 to transmit to and receive signals communicated with the target satellite 104. To enable such alignment, the removeable satellite antenna pointing tool 120 can include circuitry (e.g., a controller or a wireless transceiver) that allows bidirectional communication with a mobile device 150 through a wireless personal area network connection, such as a Bluetooth connection. The mobile device 150 can be a computing platform, such as a smart phone or tablet computer that can execute an alignment application 152. Similarly, the modem 128 can include circuitry (e.g., another wireless transceiver) for communicating with the mobile device 150 through a wireless network connection, such as a Wi-Fi connection. The mobile device 150 can execute an alignment application 152 that can process signaling for aligning the satellite antenna 106.

In the example illustrated, the target satellite 104 provides bidirectional communication between the terminal 122 and a gateway terminal 130. The gateway terminal 130 is sometimes referred to as a hub or ground station. The gateway terminal 130 includes a satellite antenna to transmit a forward uplink signal 140 to the target satellite 104 and to receive a return downlink signal 142 from the target satellite 104. The gateway terminal 130 can also schedule traffic to the terminal 122. Additionally or alternatively, the scheduling can be performed in other elements of the two-way satellite communication system 100 (e.g., a core node, network operations center (NOC) and/or or other components). The uplink signal 140 and the downlink signal 142 communicated between the gateway terminal 130 and the target satellite 104 can employ the same, overlapping or different frequencies as the uplink signal 124 and/or the downlink signal 126 communicated between the target satellite 104 and the satellite antenna 106. The gateway terminal 130 may be located remotely from the satellite ground station 102 to enable frequency reuse. By separating the gateway terminal 130 and the satellite ground station 102, spot beams with common frequency bands can be geographically separated to avoid interference.

The gateway terminal 130 can be communicatively coupled to a network 132. The network 132 can be implemented as a public network (e.g., the Internet or the public switched telephone network (PSTN)), a private network (e.g., a cellular network or an intranet) or a combination thereof (e.g., a virtual private network (VPN). The network 132 can include both wired and wireless connections as well as optical links. The network 132 can connect multiple instances of the gateway terminal 130 that may be in communication with the target satellite 104 and/or with other satellites.

The gateway terminal 130 can operate as an interface between the network 132 and the target satellite 104. The gateway terminal 130 can be configured/programmed to receive data and information directed to the terminal 122. In some examples, the gateway terminal 130 can include a computing platform (e.g., memory and a processor) with instructions to format such data and information and transmit the uplink signal 140 to the target satellite 104 for delivery to the terminal 122. Similarly, the gateway terminal 130 can be configured to receive the downlink signal 142 from the target satellite 104 (e.g. containing data and information originating from the terminal 122) that is directed to a destination accessible via the network 132. The gateway terminal 130 can also format data encoded in the received return downlink signal 142 for transmission on the network 132.

The target satellite 104 can be configured to receive the uplink signal 140 from the gateway terminal 130 and transmit the corresponding downlink signal 126 to the terminal 122. Similarly, the target satellite 104 receives an uplink signal 124 from the terminal 122 and transmits a corresponding downlink signal 142 to the gateway terminal 130. The target satellite 104 can operate in a multiple spot beam mode, transmitting and receiving a plurality of narrow beams directed to different geographic regions. Accordingly, the target satellite 104 can segregate terminals in different geographic regions into various narrow beams. Alternatively, the target satellite 104 may operate in wide area coverage beam mode, transmitting a wide area coverage beam (or multiple wide area coverage beams).

In some examples, the target satellite 104 can operate as a “bent pipe” satellite that performs frequency and polarization conversion of the received signals before retransmission of the signals to a destination. As another example, the target satellite 104 may be configured as a regenerative satellite that demodulates and remodulates the received signals before retransmission.

Figure 3:
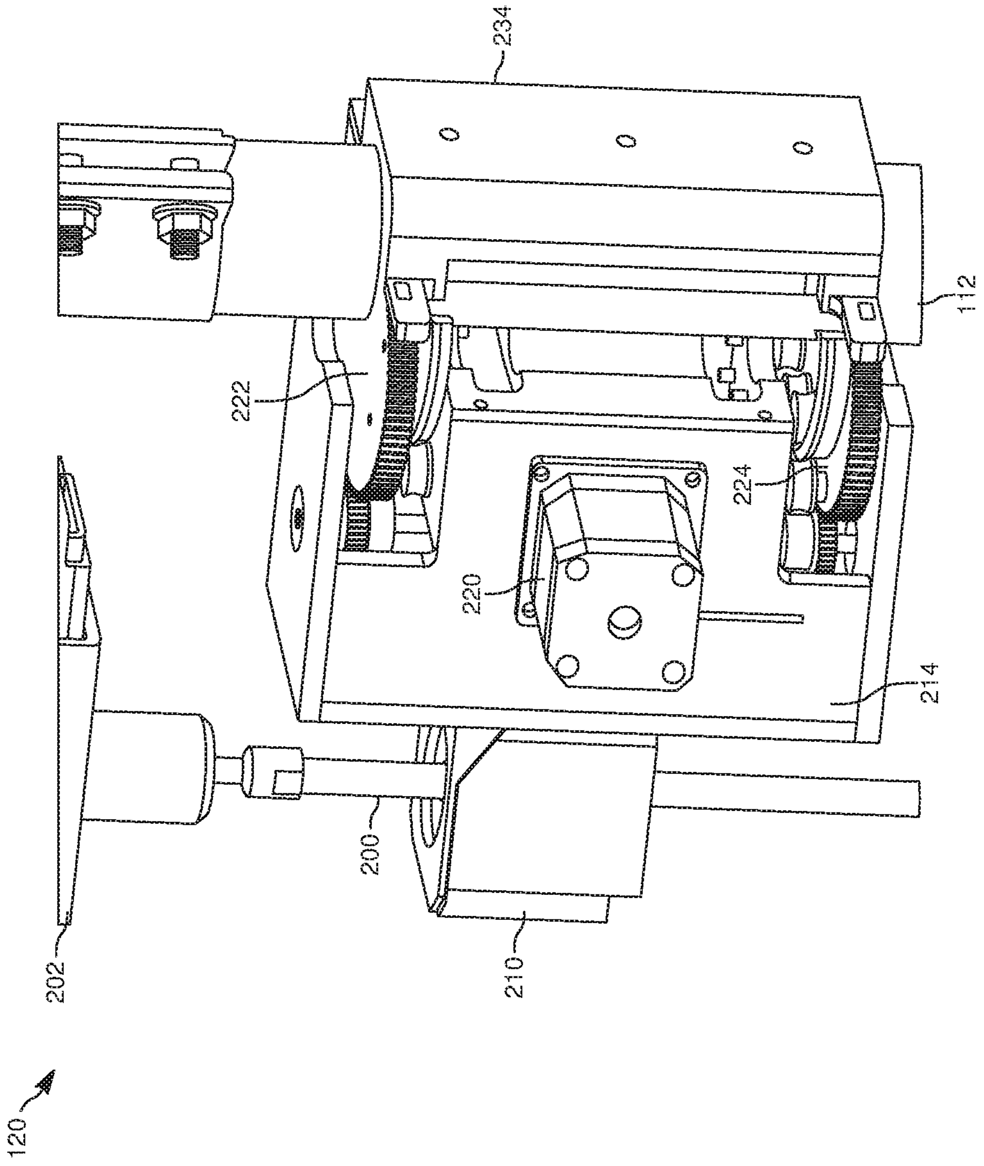
FIG. 3 illustrates a detailed view of the removeable satellite antenna pointing tool illustrated in FIG. 2.

As noted, during installation, the removeable satellite antenna pointing tool 120 can be mounted to the pole 112 of the support structure for the satellite antenna 106. The removeable satellite antenna pointing tool 120 can be employed to align the satellite antenna 106 with the target satellite 104 and subsequently removed. FIG. 3 illustrates a detailed view of the removeable satellite antenna pointing tool 120. For purposes of simplification of explanation, the same reference numbers are employed in FIGS. 1 and 2 to denote the same structure.

The removeable satellite antenna pointing tool 120 can include a control shaft 200 that that is rigidly attached to a bracket 202 coupled to the boom 111 that connects the antenna feed 110 to the parabolic reflector 108. Moreover, during installation, fasteners (e.g., bolts) for the hinge 114 and the sleeve 116 are loosened to unlock the hinge 114 and the sleeve 116, allowing adjustment to the azimuth and elevation of the satellite antenna 106. Thus, movement of the control shaft 200 causes responsive movement in the satellite antenna 106.

A vertical position (e.g., elevation) of the control shaft 200 can be controlled by a linear drive 210. As one example, the linear drive 210 can be implemented as a stepper motor that drives a screw gear. In such a situation, the control shaft

200 can be engaged with the screw gear such that actuation of the linear drive causes the control shaft 200 to raise or lower. In another example, the linear drive 210 can be implemented as a linear actuator. In yet another example, the linear drive 210 can be implemented as a hydraulic actuator.

Figure 4:
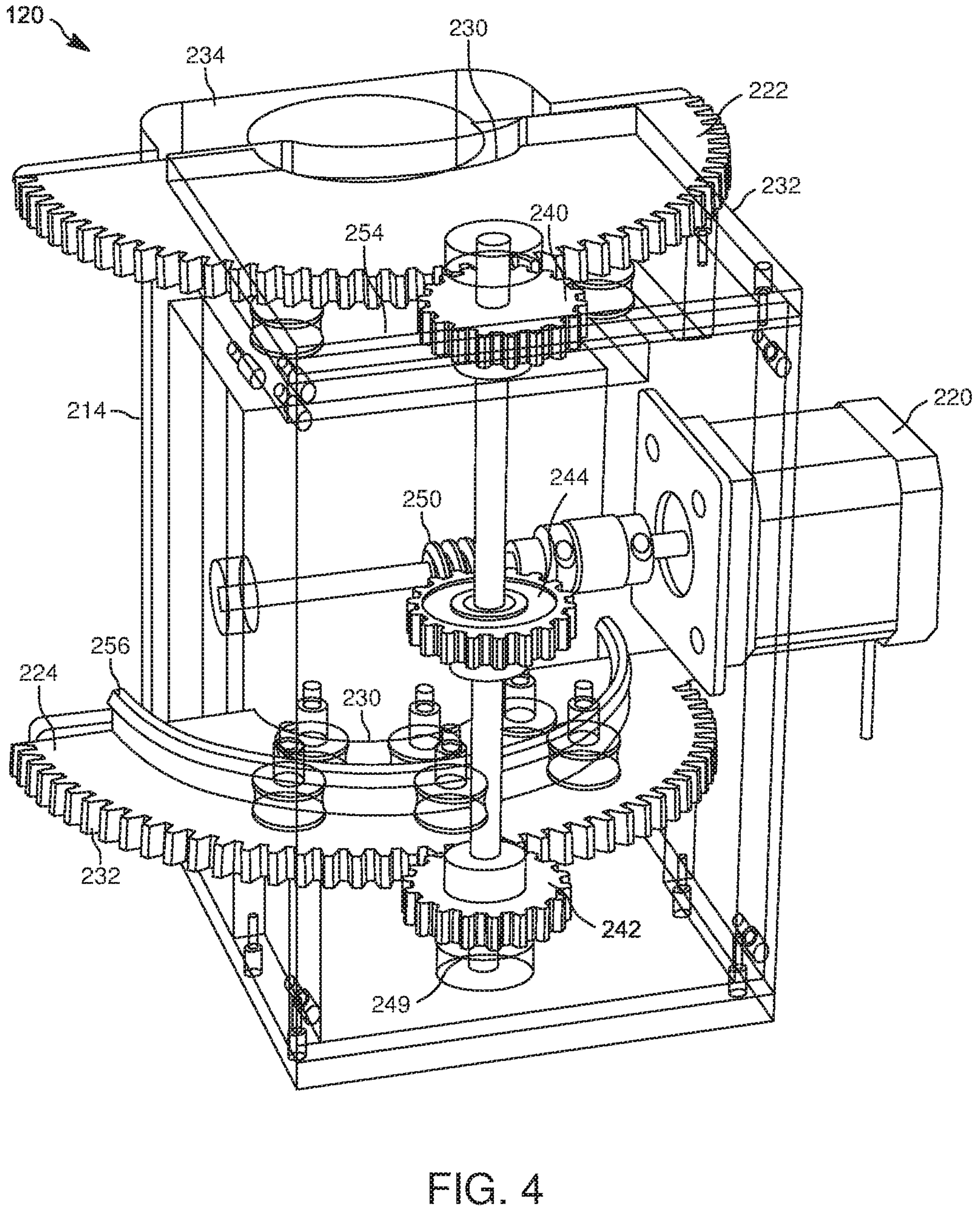
FIG. 4 illustrates a detailed view of a portion of the removeable satellite antenna pointing tool of FIG. 2.

The linear drive 210 can be affixed to a frame 214 of the removeable satellite antenna pointing tool 120. The frame 214 can support an azimuth control motor 220. FIG. 4 illustrate an example of a portion of the removeable satellite antenna pointing tool 120, wherein the frame 214 is shown in wire form to illustrate the innerworkings of the removeable satellite antenna pointing tool 120. For purposes of simplification of explanation, FIGS. 2-4 employ the same reference numbers to denote the same structure.

The removeable satellite antenna pointing tool 120 can include a first mounting gear 222 and a second mounting gear 224 that are parallel and spaced apparat from each other. Moreover, although the example illustrated includes two mounting gears, in some examples, as described herein, there is a single mounting gear, and in other examples, there can be more than two mounting gears. The first mounting gear 222 and the second mounting gear 224 can have the same shape. The first mounting gear 222 and the second mounting gear 224 each include a friction region 230 and a toothed region 232. The friction region 230 of the first mounting gear 222 and the second mounting gear 224 are shaped as arcs (e.g., semicircles) that partially circumscribe the pole 112 (omitted from FIG. 4, shown in FIGS. 2-3). Further, a detachable mounting bracket 234 can be releasably engageable with the first mounting gear 222 and the second mounting gear 224. Specifically, the detachable mounting bracket 234 can be affixed with fasteners (e.g., screws) to the first mounting gear 222 and the second mounting gear 224 to fully circumscribe the pole 112. The detachable mounting bracket 234 can be removed from the first mounting gear 222 and the second mounting gear 224 to allow removal of the removeable satellite antenna pointing tool 120 from the satellite ground station 102. In other examples, the mounting bracket 234 can be replaced with a different type of attachment mechanism, such a metallic or fabric strap. In each such situation, a force of friction between the pole 112 and the friction region 230 of the first mounting gear 222 and the second mounting gear 224 hold the first mounting gear 222 and the second mounting gear 224 in a static position.

In some examples, the first mounting gear 222 and the second mounting gear 224 are removeable (by rotation of the first mounting gear 222 and the second mounting gear 224) to allow different sizes of the first mounting gear 222 and the second mounting gear 224 to enable mounting to antenna structures with different sizes of poles 112.

The removeable satellite antenna pointing tool 120 can include an azimuth gear subsystem that can allow change to the azimuth of the satellite antenna 106. The azimuth gear subsystem includes one or more gears to transfer energy from the azimuth control motor 220 to the first mounting gear 222 and the second mounting gear 224.

The toothed region of the first mounting gear 222 can interlock with a first spur gear 240 of the azimuth gear subsystem and the second mounting gear 224 can interlock a second spur gear 242 of the azimuth gear subsystem. Additionally, a third spur gear 244 of the azimuth gear subsystem can interlock with a worm gear 250 of the azimuth gear subsystem that is driven by the azimuth control motor 220. A shaft 249 of the azimuth gear subsystem extends through a center of the first spur gear 240, the second spur gear 242 and the third spur gear 244. Accordingly, activation of the azimuth control motor 220 causes the worm gear 250 to rotate, thereby causing the first spur gear 240, the second spur gear 242 and the third spur gear 244 to rotate as well. Rotation of the first spur gear 240 and the second spur gear 242 causes the first mounting gear 222 and the second mounting gear 224 to rotate in response.

The first mounting gear 222 can include a first dovetail rail 254 and the second mounting gear 224 can include a second dovetail rail 256. The first dovetail rail 254 can protrude from a lower surface of the first mounting gear 222 and the second dovetail rail 256 can protrude from an upper surface of the second mounting gear 224. Accordingly, the first dovetail rail 254 and the second dovetail rail 256 are arranged on opposing surfaces of the respective first mounting gear 222 and the second mounting gear 224. In examples where there is one mounting gear, the first dovetail rail 254 and the second dovetail rail 256 can protrude from opposing sides of the mounting gear.

Figure 5:
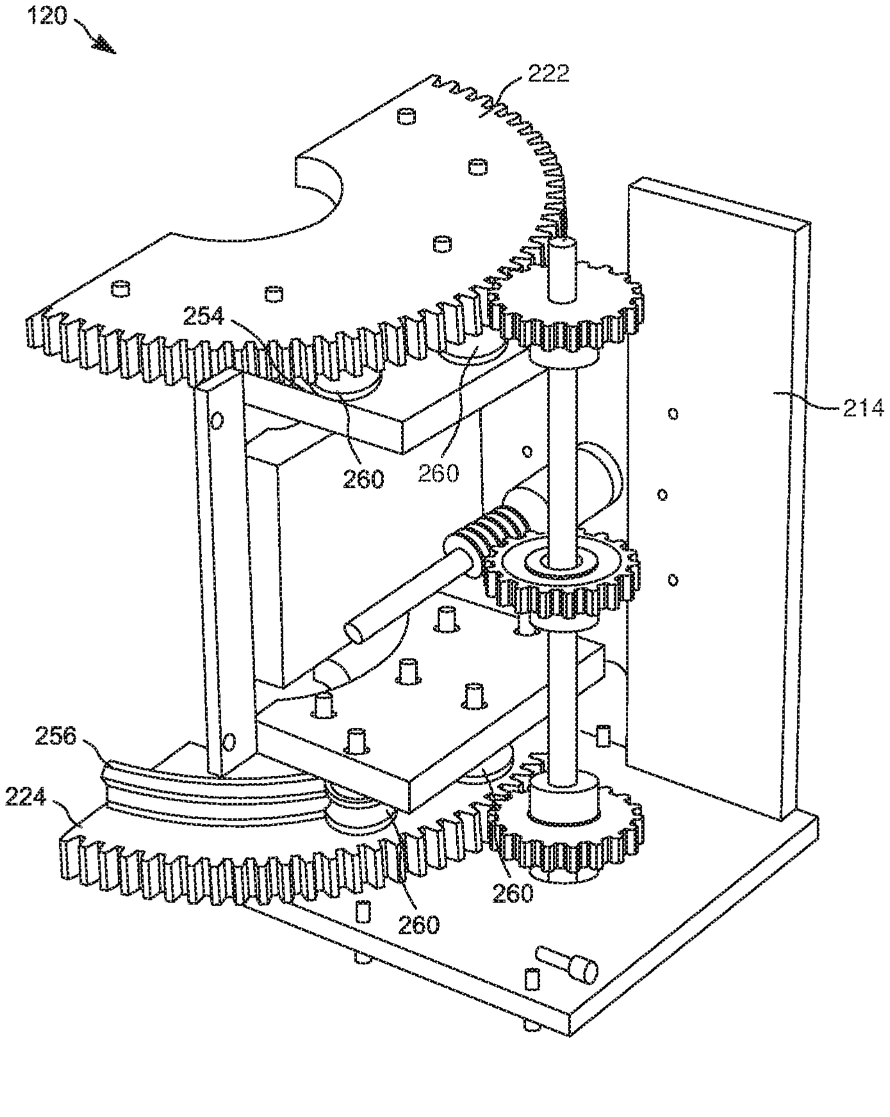
FIG. 5 illustrates a detailed view of another portion of the removeable satellite antenna pointing tool of FIG. 2.

FIG. 5 illustrates an example of a portion of the removeable satellite antenna pointing tool 120, wherein a portion of the frame 214 is removed to further illustrate the innerworkings of the removeable satellite antenna pointing tool 120. For purposes of simplification of explanation, FIGS. 2-5 employ the same reference numbers to denote the same structure. A first set of a plurality of stabilizing spindles 260 can engage the first dovetail rail 254 and a second set of the plurality of stabilizing spindles 260 can engage the second dovetail rail 256. Each of the stabilizing spindles 260 can be affixed to the frame 214 (e.g., on a plate of the frame 214). Accordingly, the stabilizing spindles 260 limit the range of motion of the first mounting gear 222 and the second mounting gear 224 to one degree of freedom such as rotation about a single axis.

Referring back to FIG. 3, activation of the azimuth control motor 220 causes the frame 214 to pivot about the pole 112, which in turn, causes the control shaft 200 to move along a horizontal a curved rack (e.g., within an angular distance of about 180 degrees or less) defined by the toothed region 232 of the first mounting gear 222 and the second mounting gear 224. Such movement causes the bracket 202 move in a horizontal plane, thereby changing an azimuth of the satellite antenna 106. As noted, activation of the linear drive 210 causes the control shaft 200 to raise or lower, such that the elevation of the satellite antenna 106 can be changed. Thus, selective control of the linear drive 210 and the azimuth control motor 220 enables adjustment to the elevation and the azimuth of the satellite antenna 106.

Referring back to FIG. 2, the mobile device 150 can include a GNSS device, a gyroscope and a magnetometer. The alignment application 152 can query the GNSS device, the gyroscope and the magnetometer to calculate a position and orientation of the mobile device 150. The calculated position and orientation, along with a known position of the target satellite 104 can be employed by the alignment application 152 to determine a pointing direction for the satellite antenna 106. The alignment application 152 can provide control signals to the removeable satellite antenna pointing tool 120 that causes the removeable satellite antenna pointing tool 120 to activate the linear drive 210 and/or the azimuth control motor 220 to make coarse changes to the respective elevation and azimuth of the satellite antenna 106. Additionally, as the satellite antenna 106 begins to point towards the target satellite 104, the modem 128 can provide a data characterizing a signal strength of the downlink signal 126 to alignment application 152 executing the mobile device 150. The alignment application 152 can leverage the signal strength to command the controller make fine adjustments to the pointing direction of the satellite antenna 106.

Upon determining that the satellite antenna 106 is pointed in a direction with a peak (or near peak) signal strength of the downlink signal 126, the hinge 114 and the sleeve 116 can be locked by tightening the associated fasteners to keep the satellite antenna 106 pointing in the same direction. Additionally, upon locking the hinge 114 and the sleeve 116, the detachable mounting bracket 234 can be removed from the removeable satellite antenna pointing tool 120, and the removeable satellite antenna pointing tool 120 can be dismounted from the pole 112. Accordingly, the installer can reuse the removeable satellite antenna pointing tool 120 to align a different satellite antenna. By employing the removeable satellite antenna pointing tool 120 to align the satellite antenna 106, inaccuracies due to human imprecision can be curtailed.

Figure 6:
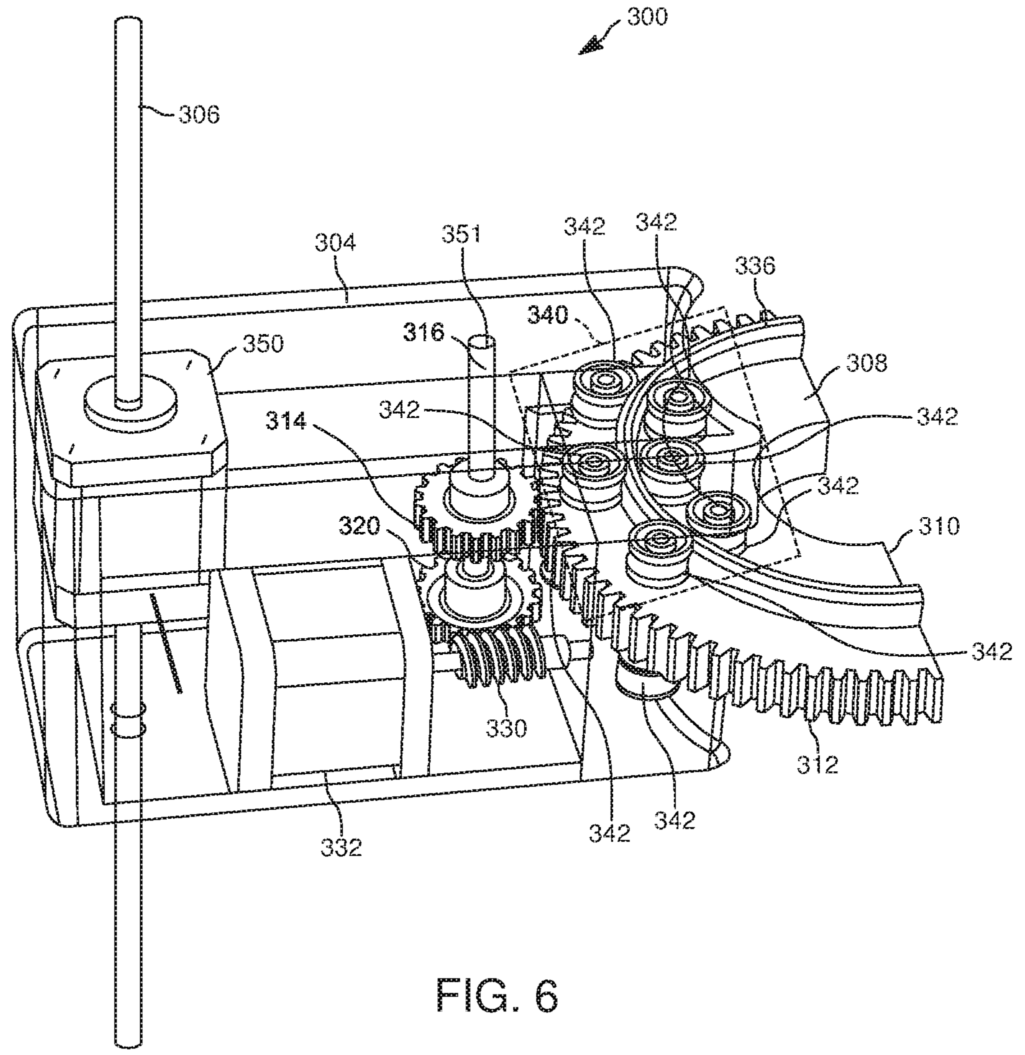
FIG. 6 illustrates another example of a removeable satellite antenna pointing tool.
Figure 7:
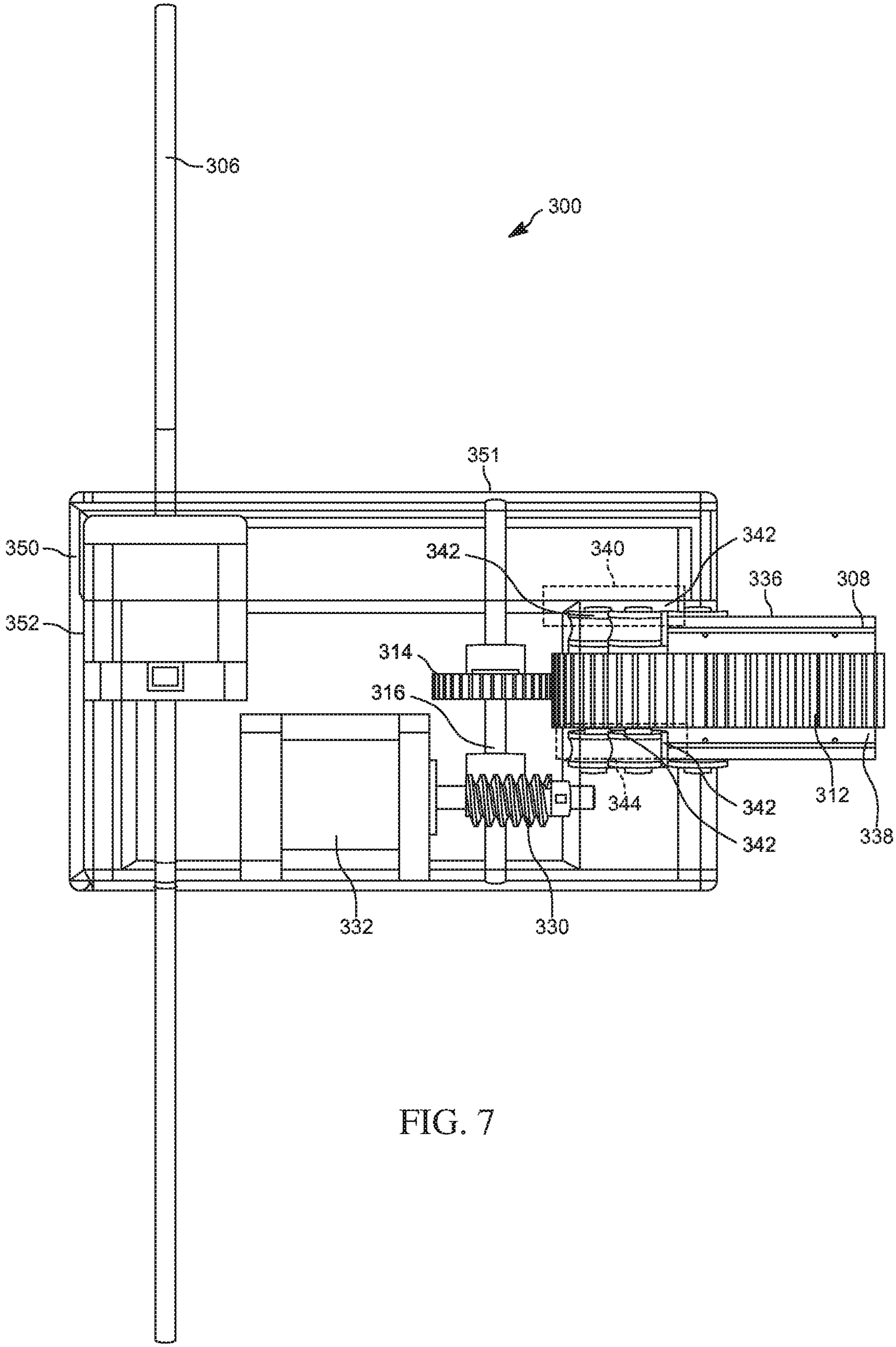
FIG. 7 illustrates a side view of the removeable satellite antenna pointing tool of FIG. 6.

FIG. 6 illustrates a perspective view of a removeable satellite antenna pointing tool 300. FIG. 7 is a side view of the removeable satellite antenna pointing tool 300. For purposes of simplification of explanation, the same reference numbers are employed in FIGS. 6 and 7 to denote the same structure. Additionally, not all reference numbers are visible in both perspectives illustrated in FIGS. 6 and 7. The removeable satellite antenna pointing tool 300 can be employed to implement the removeable satellite antenna pointing tool 2 of FIG. 1 and/or the removeable satellite antenna pointing tool 120 of FIG. 2. The removeable satellite antenna pointing tool 300 can include a frame 304. For purposes of readability, the frame 304 is illustrated as a wireframe in FIGS. 6 and 7.

The removeable satellite antenna pointing tool 300 can include a control shaft 306 that can be rigidly attached to a bracket coupled to a boom that connects an antenna feed to a reflector, such as the boom 111 of FIG. 2. The removeable satellite antenna pointing tool 300 also includes a mounting gear 308. In contrast to the removeable satellite antenna pointing tool 120 of FIG. 2, the removeable satellite antenna pointing tool 300 includes a single mounting gear that can include a friction region 310 shaped to be releasably engageable with a pole attached to a satellite antenna, such as the pole 112 illustrated in FIGS. 2-3. Additionally, the mounting gear 308 can include a toothed region 312 with a plurality of gear teeth. The removeable satellite antenna pointing tool 300 can include an azimuth gear subsystem having a set of gears for engaging the mounting gear 308 to change an azimuth of the satellite antenna. More specifically, the toothed region 312 can be interlocked with a first spur gear 314 of the azimuth gear subsystem. A shaft 316 of the azimuth gear subsystem can mechanically couple the first spur gear 314 to a second spur gear 320.

The second spur gear 320 of the azimuth gear subsystem can be interlocked with a worm gear 330 of the azimuth gear subsystem. The worm gear 330 can be driven by an azimuth control motor 332, which can be implemented as a stepper motor. In this manner, the azimuth gear subsystem can transfer energy from the azimuth control motor 332 to the mounting gear 308. Further, the mounting gear 308 can include a first dovetail rail 336 and a second dovetail rail 338. The first dovetail rail 336 can protrude from an upper surface of the mounting gear 308 and the second dovetail rail 338 can protrude from a lower surface of the mounting gear 308. Accordingly, the first dovetail rail 336 and the second dovetail rail 338 are arranged on opposing surfaces of the mounting gear 308.

A first set 340 of a plurality of stabilizing spindles 342 can engage the first dovetail rail 336 and a second set 344 of the plurality of stabilizing spindles 342 and the second dovetail rail 338. Each of the plurality of stabilizing spindles 342 can be rigidly attached to the frame 304. The first set 340 of the stabilizing spindles 342 and the second set 344 of the stabilizing spindles 342 prevent movement of the mounting gear 308 in a vertical direction. Moreover, the first set 340 of the stabilizing spindles 342 and the second set 344 of the stabilizing spindles 342 limits movement of the frame 304 to one degree of freedom, such as rotation along the path defined by the first dovetail rail 336 and the second dovetail rail 338, such as an arc of about 180 degrees.

As noted, the mounting gear 308 incudes a friction region 310 shaped to mount to the pole for a satellite antenna. In some examples, the mounting gear 308 is removeable (by rotation of the mounting gear 308) to allow different mounting gears of different sizes to enable mounting on poles of different sizes. The mounting gear 308 can be affixed to the pole by an attachment mechanism. The attachment mechanism can be implemented, for example, as a removeable mounting bracket that can be attached to the mounting gear 308. In other examples, the attachment mechanism can be implemented as a metallic or fabric strap that can press the mounting gear 308 against the pole.

The removeable satellite antenna pointing tool 300 also include a linear drive 350 for controlling an elevation of the control shaft 306. The linear drive 350 can be implemented, for example, as a stepper motor that controls a screw gear to drive the control shaft 306. In other examples, the linear drive can be implemented as a linear actuator. In yet other examples, the linear drive 350 can be implemented as a hydraulic actuator. A controller (not shown), such as the controller 42 of FIG. 1 can be embedded in the removeable satellite antenna pointing tool 300 to facilitate pointing of the satellite antenna, to which the removeable satellite antenna pointing tool 300 can be temporarily attached.

Operation of the removeable satellite antenna pointing tool 300 is similar to the operation of the removeable satellite antenna pointing tool 2 of FIG. 1 and the removeable satellite antenna pointing tool 120 of FIG. 2. More specifically, actuation of the azimuth control motor 332 causes the worm gear 330 to spin, which in turn causes the second spur gear 320 and the first spur gear 314 to spin. If the removeable satellite antenna pointing tool 300 is mounted on a pole of a satellite antenna, spinning of the first spur gear 314 causes the frame 304 and the components contained therein to rotate about the pole. Similarly, actuation of the linear drive 350 changes an elevation of the control shaft 306. If the control shaft 306 is rigidly attached to the satellite antenna, actuation of the azimuth control motor 332 changes an azimuth of the satellite antenna and actuation of the linear drive 350 changes the elevation of the satellite antenna. Thus, signals from an external mobile device (e.g., the mobile device 60 of FIG. 1 and/or the mobile device 150 of FIG. 2) can command the controller of the removeable satellite antenna pointing tool 300 to change an azimuth and/or an elevation of the satellite antenna, and in response, the controller can control the azimuth control motor 332 and/or the linear drive 350.

Furthermore, in some examples, the removeable satellite antenna pointing tool 300 can include a manual access port 351. The first manual access port 351 is shaped to receive drill head (e.g., a keystone drill head) to allow an electric drill to rotate the shaft 316 in the event of a failure of the azimuth control motor 332 and change an azimuth of the satellite antenna. Further, in such an example, a second manual access port 352 can be included to receive the drill head to allow the electric drill to raise and lower the control shaft 306 to change an elevation of the satellite antenna.

Figure 8:
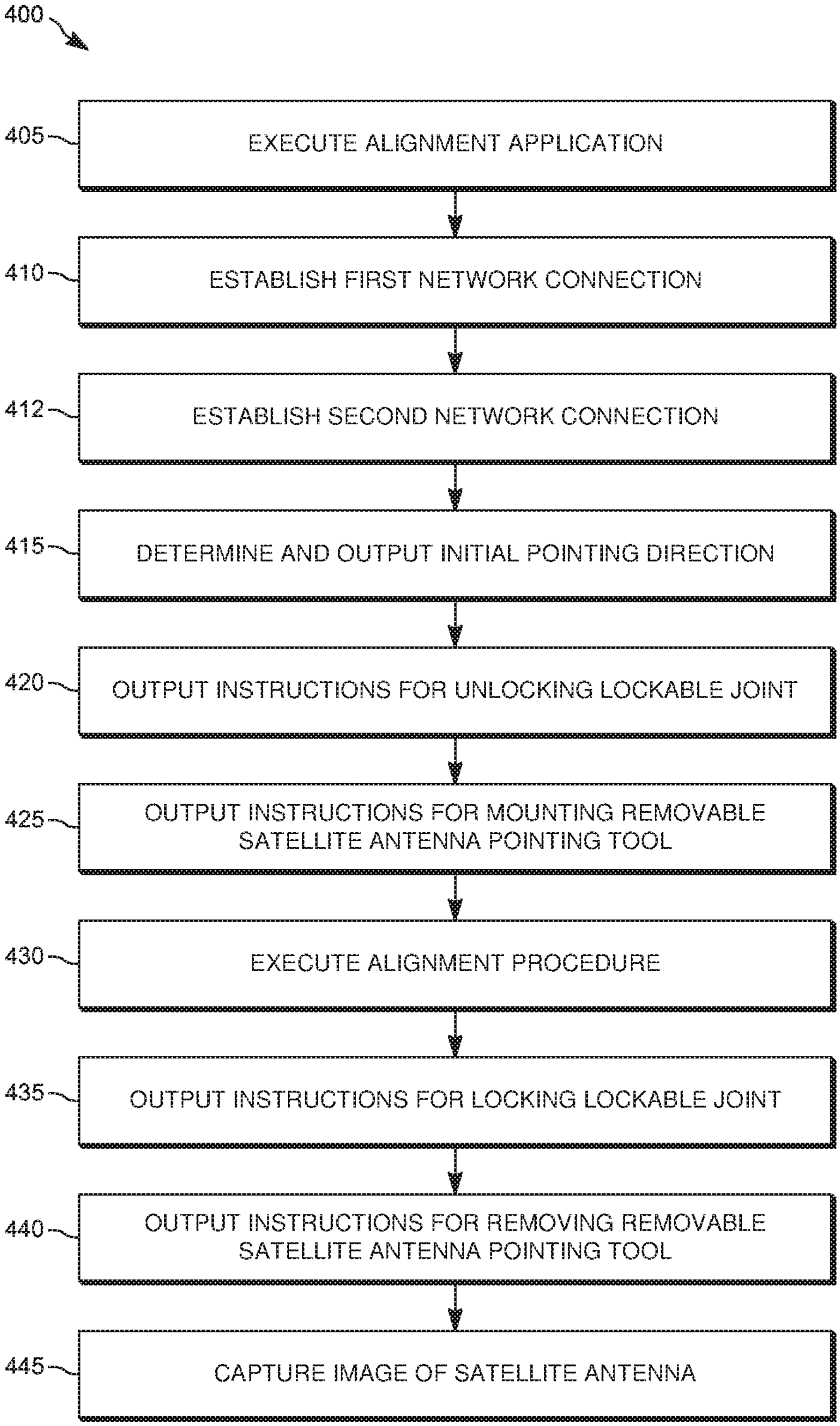
FIG. 8 illustrates a flowchart of an example method for aligning a satellite antenna to point at a target satellite.

In view of the foregoing structural and functional features described above, an example method will be better appreciated with reference to FIG. 8. While, for purposes of simplicity of explanation, the example methods of FIG. 8 is shown and described as executing serially, the present examples are not limited by the illustrated order, as some actions can in other examples occur in different orders, multiple times and/or concurrently from that shown and described herein. Moreover, it is not necessary that all described actions be performed to implement a method.

FIG. 8 illustrates a flow chart of an example method 400 for aligning a satellite antenna, such as the satellite antenna 8 of FIG. 1 and/or the satellite antenna 106 of FIG. 2. The method 400 can be executed by a mobile device (e.g., the mobile device 60 of FIG. 1 and/or the mobile device 150 of FIG. 2) operating in concert with a removeable satellite antenna pointing tool (e.g., the removeable satellite antenna pointing tool 2 of FIG. 1, the removeable satellite antenna pointing tool 120 of FIG. 2 and/or the removeable satellite antenna pointing tool 300 of FIG. 7). In the method 400, it is presumed that the mobile device is a smartphone. FIGS. 9-18 illustrate example screenshots that could be output by the mobile device during the execution of the method 400.

Figure 10:
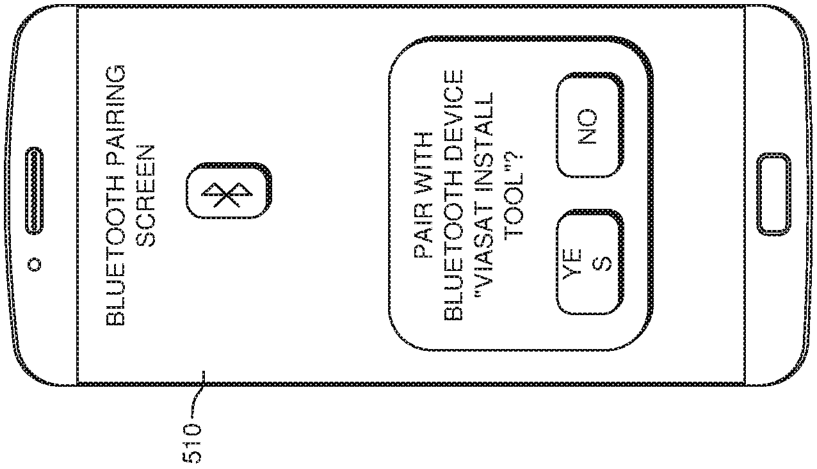
FIG. 10 illustrates an example screenshot of a mobile device outputting information for establishing another network connection.
Figure 9:
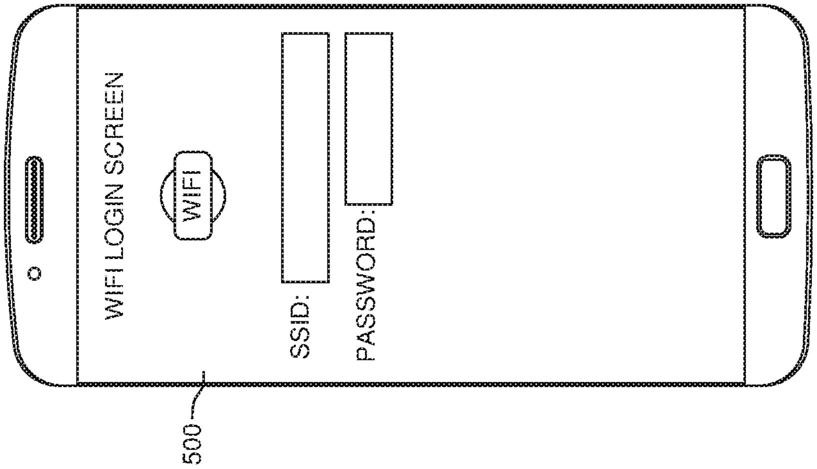
FIG. 9 illustrates an example screenshot of a mobile device outputting information for establishing a network connection.

At 405, the installer can execute an alignment application (e.g., the alignment application 62 of FIG. 1 and/or the alignment application 152 of FIG. 2) on the mobile device. At 410, the alignment application establishes a first network connection (e.g., a Wi-Fi connection) with a modem operating on a terminal (e.g., the modem 22 of FIG. 1 and/or the modem 128 of FIG. 2). FIG. 9 illustrates an example of a screenshot 500 on the mobile device that could be output by the alignment application alignment application to allow user interaction to establish the first network connection. Referring back to FIG. 8, at 412, the alignment application establishes a second network connection (e.g., a Bluetooth connection) with a controller (e.g., the controller 42 of FIG. 1) operating on the removeable satellite antenna pointing tool 120. FIG. 10 illustrates an example of a screenshot 510 on the mobile device that could be output by the alignment application to allow user interaction to establish the second network connection.

Figure 11:
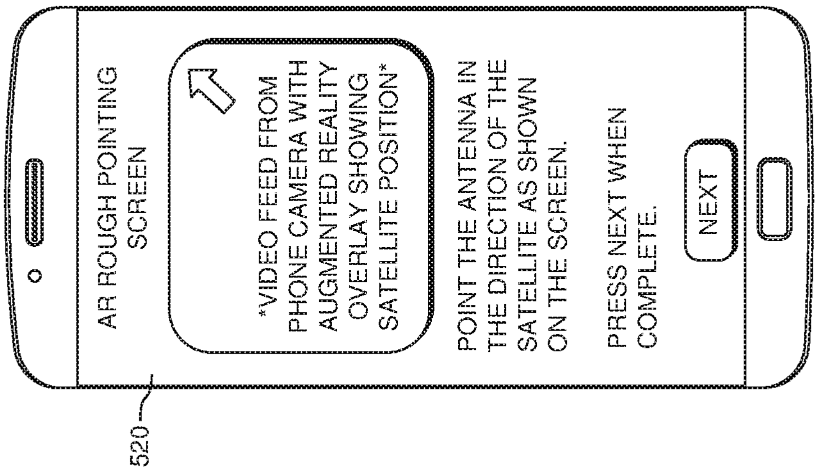
FIG. 11 illustrates an example screenshot of a mobile device outputting information for setting an initial pointing direction of a satellite antenna.

Referring back to FIG. 8, at 415, the alignment application can query a GNSS device, a magnetometer and a gyroscope operating on the mobile device to determine an initial pointing direction for the satellite antenna and the alignment application can output the initial pointing direction. FIG. 11 illustrates an example of a screenshot 520 on the mobile device that could be output by the alignment application illustrating the initial pointing position. In particular, the screenshot 520 outputs an augment reality (AR) rough pointing screen that includes an video feed from an internal camera of the mobile device an AR overlay illustrating a target satellite (e.g., the target satellite 16 of FIG. 1 and/or the target satellite 104 of FIG. 2) position. The installer can employ the AR overlay to set the initial pointing position of the satellite antenna (e.g., within 90 degrees of the target satellite).

Figure 12:
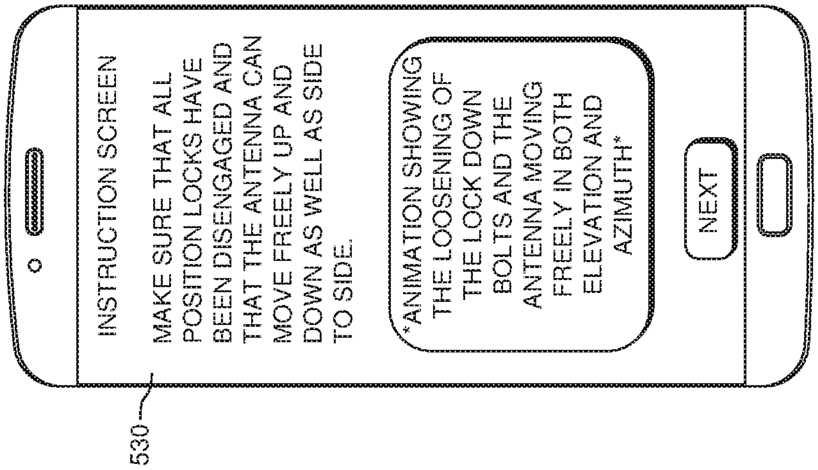
FIG. 12 illustrates an example screenshot of a mobile device outputting instructions for unlocking a lockable joint for a satellite antenna.
Figure 13:
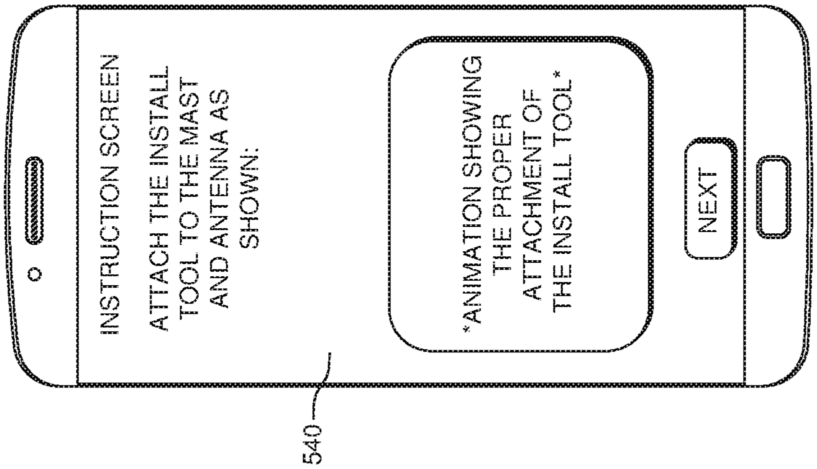
FIG. 13 illustrates an example screenshot of a mobile device outputting instructions for attaching a removeable satellite antenna pointing tool to a pole supporting a satellite antenna.

Referring back to FIG. 8, at 420, the alignment application can output instructions for unlocking a lockable joint of a support structure for the satellite antenna. FIG. 12 illustrates an example of a screenshot 530 on the mobile device that could be output by the alignment application illustrating a process for unlocking a lockable joint (e.g., the lockable joint 17 of FIG. 1) of support structure the satellite antenna (e.g., an animation for loosening bolts). The installer can follow the directions to allow the satellite antenna to pivot on at least two axes. Referring back to FIG. 8, at 425, the alignment application can output instructions for mounting the removeable satellite antenna pointing tool on a pole that supports the satellite antenna. FIG. 13 illustrates an example of a screenshot 540 on the mobile device that could be output by the alignment application illustrating a process for mounting the removeable satellite antenna pointing tool. The screenshot 540 can include an animation showing the proper procedure for attaching the removeable satellite antenna pointing tool to the pole.

Figure 14:
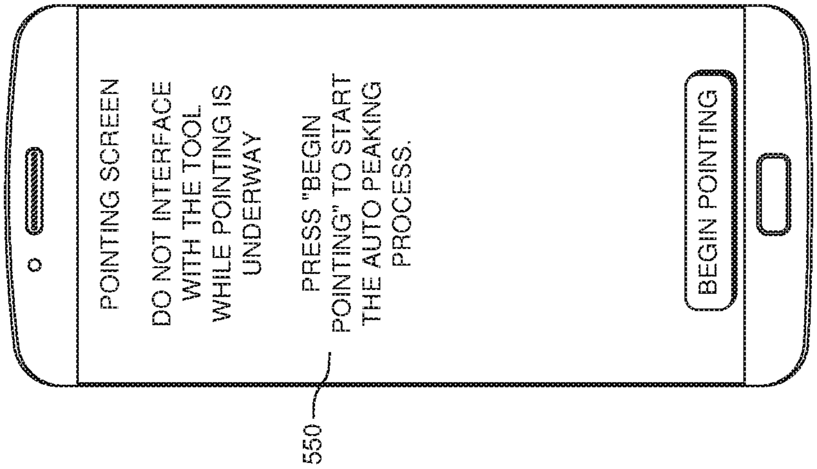
FIG. 14 illustrates an example screenshot of a mobile device outputting an option to execute an alignment procedure to align a satellite antenna.
Figure 15:
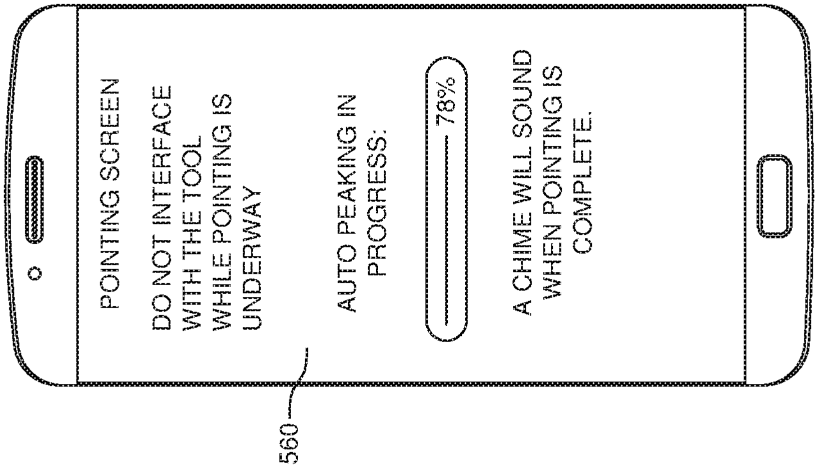
FIG. 15 illustrates an example screenshot of a mobile device outputting information during execution of an alignment procedure to align a satellite antenna.

Referring back to FIG. 8, at 430, the alignment application can execute an alignment procedure. During the alignment procedure, the alignment application can communicate with the controller via the second network connection to set a coarse pointing direction for the satellite antenna. In response, the controller can calculate a current orientation of the satellite antenna and command an azimuth control motor (e.g., the azimuth control motor 40 of FIG. 1, the azimuth control motor 220 of FIG. 3 and/or the azimuth control motor 332 of FIG. 6) an linear drive (e.g., the linear drive 50 of FIG. 1) to set the coarse pointing direction for the satellite antenna. Additionally, upon setting the coarse pointing direction, the modem can detect a downlink signal from the target antenna. The alignment application can query the modem for a strength of the downlink signal and command the controller to make fine adjustments to the azimuth and/or the elevation of the satellite antenna to find a direction of a peak (or near peak) signal from the target satellite. FIG. 14 illustrates an example of a screenshot 550 on the mobile device that could be output by the alignment application allowing the installer to initiate execution of the alignment procedure. FIG. 15 illustrates an example of a screenshot 560 on the mobile device that could be output by the alignment during execution of the alignment procedure. In some examples, the alignment application can output a warning or other notification indicating that acceleration (e.g., due to excessive vibration) exceeds a threshold (e.g., wherein such acceleration can be due to improper mounting of the satellite antenna) is preventing completion of the alignment of the satellite antenna. In such a situation, the installer may inspect and correct the mounting of the satellite support structure.

Figure 16:
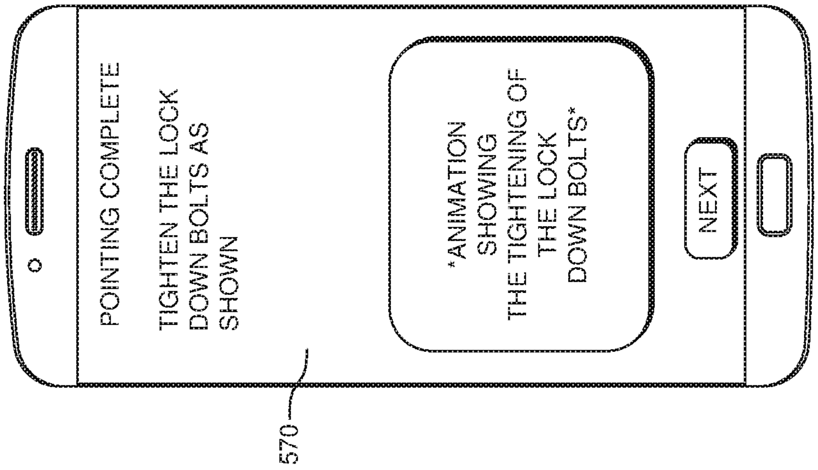
FIG. 16 illustrates an example screenshot of a mobile device outputting instructions for locking a lockable joint for the satellite antenna.

Referring back to FIG. 8, at 435 the alignment application can output instructions for locking the lockable joint of the support structure of the satellite antenna to maintain the satellite antenna in a static position. FIG. 15 illustrates an example of a screenshot 570 on the mobile device that could be output by the alignment application to instruct the installer of the procedure for locking the lockable joint of the support structure for the satellite antenna (e.g., fastening bolts). Referring back to FIG. 8, at 440 the alignment application can output instructions for removing the removeable satellite antenna tool from the pole of the support structure for the satellite antenna. FIG. 16 illustrates an example of a screenshot 580 of the mobile device that could be output by the alignment application to instruct the installer of the procedure removing the removeable satellite antenna tool. The installer can follow the instruction so that the removeable satellite antenna pointing tool can be reused on a different satellite antenna.

Figure 17:
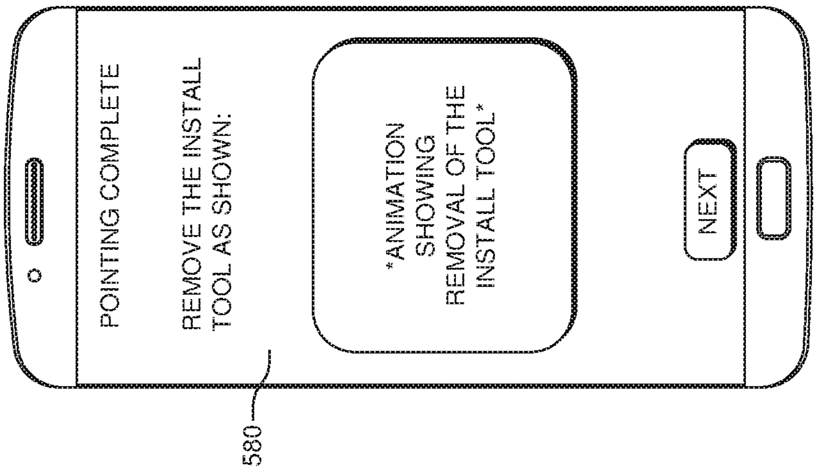
FIG. 17 illustrates an example screenshot of a mobile device outputting instructions for removing a removeable satellite antenna pointing tool from an antenna support structure.
Figure 18:
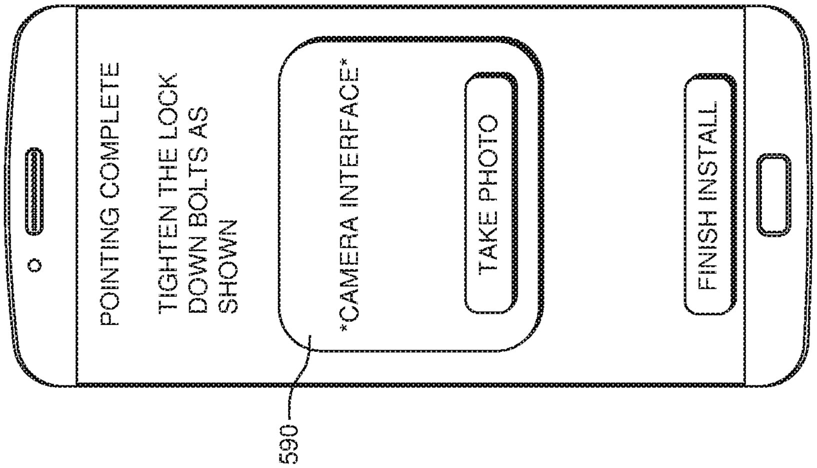
FIG. 18 illustrates an example screenshot of a mobile device outputting options for capturing an image of a satellite antenna.

Referring back to FIG. 8, at 445 the alignment application can capture an image of the satellite antenna as confirmation that the satellite antenna is aligned. FIG. 17 illustrates a screenshot 590 of the mobile device that could be output by the alignment application to allow the installer to capture the image. The screenshot 590 includes an output of a camera of the mobile device and allows the installer to capture the image with the actuation of a virtual button.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A removeable satellite antenna pointing tool comprising:

a mounting gear releasably engageable with a pole that supports a satellite antenna;

an azimuth gear subsystem housed in a frame and engaged with the mounting gear;

a motor that drives the azimuth gear subsystem, wherein actuation of the motor causes the frame to rotate about the pole;

a linear drive that controls an elevation of a control shaft engageable with a fixture attached to the satellite antenna;

a controller comprising embedded machine executable instructions that is configured to communicate with a mobile computing device and is configured to control the motor and the linear drive; and an accelerometer configured to detect an unstable or improperly mounted satellite antenna or oriented to measure vertical acceleration of the satellite antenna, wherein the controller is configured to provide a notification to the mobile computing device; and wherein actuation of the motor is configured to change an azimuth of the satellite antenna and actuation of the linear drive is configured to change an elevation of the satellite antenna.

2. A removeable satellite antenna pointing tool comprising:

a mounting gear releasably engageable with a pole that supports a satellite antenna;

an azimuth gear subsystem housed in a frame and engaged with the mounting gear;

a motor that drives the azimuth gear subsystem, wherein actuation of the motor causes the frame to rotate about the pole; and a linear drive that controls an elevation of a control shaft engageable with a fixture attached to the satellite antenna;

wherein actuation of the motor is configured to change an azimuth of the satellite antenna and actuation of the linear drive is configured to change an elevation of the satellite antenna, and wherein the mounting gear further comprises:

a first dovetail rail protruding from a first surface of the mounting gear, wherein a first set of a plurality of stabilizing spindles are engaged with the first dovetail rail; and a second dovetail rail protruding from a second surface of the mounting gear, wherein a second set of the plurality of stabilizing spindles are engaged with the second dovetail rail, wherein each of the plurality of stabilizing spindles is rigidly attached to the frame of the removeable satellite antenna pointing tool to limit a range of motion of the frame to a single axis of rotation.

3. The removeable satellite antenna pointing tool of claim 1, wherein the mounting gear comprises:

a friction region having a first radius of curvature, the friction region being shaped to partially circumscribe the pole; and a toothed region having a second radius of curvature, the second radius of curvature being greater than the first radius of curvature.

4. The removeable satellite antenna pointing tool of claim 1, further comprising:

a controller comprising embedded machine executable instructions that is configured to communicate with a mobile computing device and is configured to control the motor and the linear drive, wherein the mobile computing device is configured to command the controller to make coarse adjustments to the azimuth and/or the elevation of the satellite antenna based on a position of a satellite relative to a calculated position of the mobile computing device, and wherein the mobile computing device is further configured to command the controller to make fine adjustments to the azimuth and/or the elevation of the satellite antenna based on a signal strength of a satellite signal received at the satellite antenna.

5. The removeable satellite antenna pointing tool of claim 1, further comprising:

a controller comprising embedded machine executable instructions that is configured to communicate with a mobile computing device and is configured to control the motor and the linear drive, wherein the controller is configured to employ one of a spiral drive algorithm and a step track algorithm to execute the fine adjustments to the azimuth and/or the elevation of the satellite antenna.

6. The removeable satellite antenna pointing tool of claim 1, further comprising:

a controller comprising embedded machine executable instructions that is configured to communicate with a mobile computing device and is configured to control the motor and the linear drive, wherein the controller controls the motor and the linear drive to determine a position of the frame and the control shaft relative to the satellite antenna.

7. A removeable satellite antenna pointing tool comprising:

a mounting gear releasably engageable with a pole that supports a satellite antenna;

an azimuth gear subsystem housed in a frame and engaged with the mounting gear;

a motor that drives the azimuth gear subsystem, wherein actuation of the motor causes the frame to rotate about the pole; and a linear drive that controls an elevation of a control shaft engageable with a fixture attached to the satellite antenna;

wherein actuation of the motor is configured to change an azimuth of the satellite antenna and actuation of the linear drive is configured to change an elevation of the satellite antenna, and wherein the azimuth gear subsystem further comprises:

a first spur gear engaged with the mounting gear;
a second spur gear mechanically coupled to the first spur gear with a shaft; and
a worm gear interlocked with the second spur gear, wherein the motor is configured to drive the worm gear.

8. The removeable satellite antenna pointing tool of claim 1, further comprising an attachment mechanism releasably engageable with the mounting gear to apply a compressive force on the pole to maintain the mounting gear in a static position.

9. The removeable satellite antenna pointing tool of claim 1, further comprising a removeable bracket mountable on the mounting gear, wherein the pole supporting the satellite antenna is circumscribed by the mounting gear and the removeable bracket when the removeable bracket is mounted on the mounting gear.

10. The removeable satellite antenna pointing tool of claim 1, wherein the motor is a first motor, and the linear drive comprises:
a second motor, wherein actuation of the linear drive actuates the second motor; and
a screw gear driven by the second motor, the screw gear engaging the control shaft.

11. The removeable satellite antenna pointing tool of claim 1, wherein the satellite antenna is a component of a very small aperture terminal (VSAT) satellite ground station that establishes two-way communication with a satellite.

12. The removeable satellite antenna pointing tool of claim 1 further comprising:
wherein the mounting gear further comprises:
a friction region having a first radius of curvature, the friction region being shaped to partially circumscribe the pole; and
a toothed region having a second radius of curvature, the second radius of curvature being greater than the first radius of curvature;
wherein the azimuth gear subsystem further comprises a gear interlocked with the toothed region of the mounting gear;
wherein the motor rigidly is attached to the frame of the removeable satellite antenna pointing tool, the motor driving the azimuth gear subsystem to rotate the frame about the pole with one degree of freedom; and
wherein the linear drive is affixed to the frame of the removeable satellite antenna pointing tool.

13. An antenna pointing tool comprising:
a mounting gear for engaging with a pole that is configured to support an antenna;
an azimuth gear subsystem housed in a frame and engaged with the mounting gear;
a motor for driving the azimuth gear subsystem, wherein actuation of the motor causes the frame to rotate, wherein the azimuth gear subsystem further comprises:
a first spur gear engaged with the mounting gear;
a second spur gear mechanically coupled to the first spur gear with a shaft; and
a worm gear interlocked with the second spur gear, wherein the motor is configured to drive the worm gear; and
wherein actuation of the motor is configured to change an azimuth of the antenna.

14. The antenna pointing tool of claim 13, further comprising:
a linear drive for controlling an elevation of a control shaft engageable with a fixture attachable to the antenna,
wherein actuation of the linear drive is configured to change an elevation of the antenna.

15. The antenna pointing tool according to claim 13, wherein the mounting gear is configured to releasably engage with the pole.

16. The antenna pointing tool according to claim 13, wherein the motor is an electric motor.

17. The removeable satellite antenna pointing tool of claim 2, wherein the mounting gear is a first mounting gear, the first mounting gear comprising:
a first friction region having a first radius of curvature, the first friction region being shaped to partially circumscribe the pole; and
a first toothed region having a second radius of curvature, the second radius of curvature being greater than the first radius of curvature, the removeable satellite antenna pointing tool further comprising:
a second mounting gear arranged parallel to the first mounting gear, the second mounting gear comprising:
a second friction region having the first radius of curvature, the second friction region being shaped to partially circumscribe the pole that supports the satellite antenna; and
a second toothed region having the second radius of curvature.

* * * * *